US012701218B2

(12) United States Patent
Yang

(10) Patent No.: US 12,701,218 B2
(45) Date of Patent: Aug. 4, 2026

(54) DEVICE AND METHOD FOR DECODING VIDEO DATA

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 115 days.

(21) Appl. No.: 18/599,701

(22) Filed: Mar. 8, 2024

(65) Prior Publication Data

US 2024/0305771 A1     Sep. 12, 2024

Related U.S. Application Data

(60) Provisional application No. 63/451,109, filed on Mar. 9, 2023.

(51) Int. Cl.
| | |
|---|---|
| *H04N 19/105* | (2014.01) |
| *H04N 19/117* | (2014.01) |
| *H04N 19/132* | (2014.01) |
| *H04N 19/176* | (2014.01) |
| *H04N 19/593* | (2014.01) |

(52) U.S. Cl.
CPC ......... *H04N 19/105* (2014.11); *H04N 19/117* (2014.11); *H04N 19/132* (2014.11); *H04N 19/176* (2014.11); *H04N 19/593* (2014.11)

(58) Field of Classification Search
CPC .. H04N 19/105; H04N 19/117; H04N 19/132; H04N 19/176; H04N 19/593
See application file for complete search history.

(56) References Cited

U.S. PATENT DOCUMENTS

| | | | | |
|---|---|---|---|---|
| 2024/0107023 A1* | 3/2024 | Han | ...................... | H04N 19/132 |
| 2024/0275965 A1* | 8/2024 | Gao | ...................... | H04N 19/105 |

OTHER PUBLICATIONS

"Series H: Audiovisual and Multimedia Systems Infrastructure of audiovisual services—Coding of moving video, Versatile video coding", ITU-T H.266 (Apr. 2022).

(Continued)

*Primary Examiner* — Hesham K Abouzahra
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further determines, for the block unit, multiple integer-sample reference blocks and multiple fractional-sample reference blocks from the current frame, determines multiple integer-sample template cost values based on the plurality of integer-sample reference blocks, and determines multiple fractional-sample template cost values based on the multiple fractional-sample reference blocks. The method then selects multiple prediction reference blocks from the multiple integer-sample reference blocks and the multiple fractional-sample reference blocks based on the multiple integer-sample template cost values and the multiple fractional-sample template cost values and reconstructs the block unit based on the multiple prediction reference blocks. Each of the multiple fractional-sample reference blocks is located at one of multiple fractional-sample positions in the current frame.

18 Claims, 8 Drawing Sheets

(56)                         References Cited

OTHER PUBLICATIONS

Muhammed Coban et al., "Algorithm description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022.

Adrian Browne et al., "Algorithm description for Versatile Video Coding and Test Model 18 (VTM18)", JVET-AB2002-v3, Joint Video Experts Team (JVET) of ITU-T SG 16 WP 3 and ISO/IEC JTC 1/SC 29, 28th Meeting, Mainz, DE, Oct. 20-28, 2022.

Benjamin Bross et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by teleconference, Oct. 7-16, 2020.

Benjamin Bross et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.

* cited by examiner

100

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/451,109, filed on Mar. 9, 2023, entitled "Intra-Template Matching with Fractional Precision," the content of which is hereby incorporated herein fully by reference in its entirety for all purposes.

FIELD

The present disclosure generally relates to video coding, and more specifically, to techniques for predicting a block unit based on multiple reference blocks.

BACKGROUND

Intra template matching is a coding tool for video coding, in which, an encoder and/or a decoder may search a matching block for the current block from the reconstructed area of the current frame.

When the encoder and/or the decoder search the matching block, they merely consider multiple reference blocks, each including multiple previously reconstructed pixels. However, the previously reconstructed pixels may be inadequate to predict all of the block units in the video. In addition, fractional-sample movements are not considered in such a prediction mode.

Thus, different kinds of intra template matching may be required for the encoder and/or the decoder to be able to precisely and efficiently predict and/or reconstruct the block unit.

SUMMARY

The present disclosure is directed to a device and method for predicting a block unit based on more than one of integer-sample reference blocks and fractional-sample reference blocks.

In a first aspect of the present disclosure, a method of decoding video data and an electronic device for performing the method are provided. The method includes receiving the video data; determining a block unit from a current frame included in the video data; determining, for the block unit, multiple integer-sample reference blocks and multiple fractional-sample reference blocks from the current frame, wherein: each of the multiple integer-sample reference blocks is located at one of multiple integer-sample positions in the current frame, and each of the multiple fractional-sample reference blocks is located at one of multiple fractional-sample positions in the current frame; determining multiple integer-sample template cost values based on the multiple integer-sample reference blocks; determining multiple fractional-sample template cost values based on the multiple fractional-sample reference blocks; selecting multiple prediction reference blocks from the multiple integer-sample reference blocks and the multiple fractional-sample reference blocks based on the multiple integer-sample template cost values and the multiple fractional-sample template cost values; and reconstructing the block unit based on the multiple prediction reference blocks.

In an implementation of the first aspect of the present disclosure, at least one of the multiple prediction reference blocks is selected from the multiple fractional-sample reference blocks.

An implementation of the first aspect of the present disclosure further includes determining multiple weighting parameters based on the multiple integer-sample template cost values and the fractional-sample template cost values for the multiple prediction reference blocks; weightedly combining the multiple prediction reference blocks based on the multiple weighting parameters to determine a predicted block, wherein reconstructing the block unit is further based on the predicted block.

An implementation of the first aspect of the present disclosure further includes determining an arrangement of the multiple integer-sample reference blocks and the multiple fractional-sample reference blocks based on the multiple integer-sample template cost values and the multiple fractional-sample template cost values, wherein selecting the multiple prediction reference blocks is further based on the arrangement.

An implementation of the first aspect of the present disclosure further includes determining a reference area of the block unit from the current image, wherein: the reference area is reconstructed prior to reconstructing the block unit, and the multiple integer-sample reference blocks and the multiple fractional-sample reference blocks are determined from the reference area of the block unit.

An implementation of the first aspect of the present disclosure further includes determining, from the reference area, a block template region neighboring the block unit; determining, from the reference area, multiple integer-sample template regions, each neighboring one of the multiple integer-sample reference blocks, wherein each of the multiple integer-sample template cost values is determined by calculating a difference between the block template region and a corresponding one of the multiple integer-sample template regions; and determining, from the reference area, multiple fractional-sample template regions, each neighboring one of the multiple fractional-sample reference blocks, wherein each of the multiple fractional-sample template cost values is determined by calculating a difference between the block template region and a corresponding one of the multiple fractional-sample template regions.

An implementation of the first aspect of the present disclosure further includes sub-sampling the reference area based on the block unit by a sub-sampling factor to determine the multiple integer-sample reference blocks; determining multiple intermediate reference blocks from the multiple integer-sample reference blocks based on the multiple integer-sample template cost values; and determining the multiple fractional-sample reference blocks, each neighboring one of the multiple intermediate reference blocks.

An implementation of the first aspect of the present disclosure further includes determining the sub-sampling factor for the block unit from the video data.

In an implementation of the first aspect of the present disclosure, the reference area includes multiple reconstructed samples reconstructed prior to reconstructing the block unit; and each of the multiple fractional-sample reference blocks is determined by using an interpolation filter to filter, respectively, at least one of the multiple reconstructed samples.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
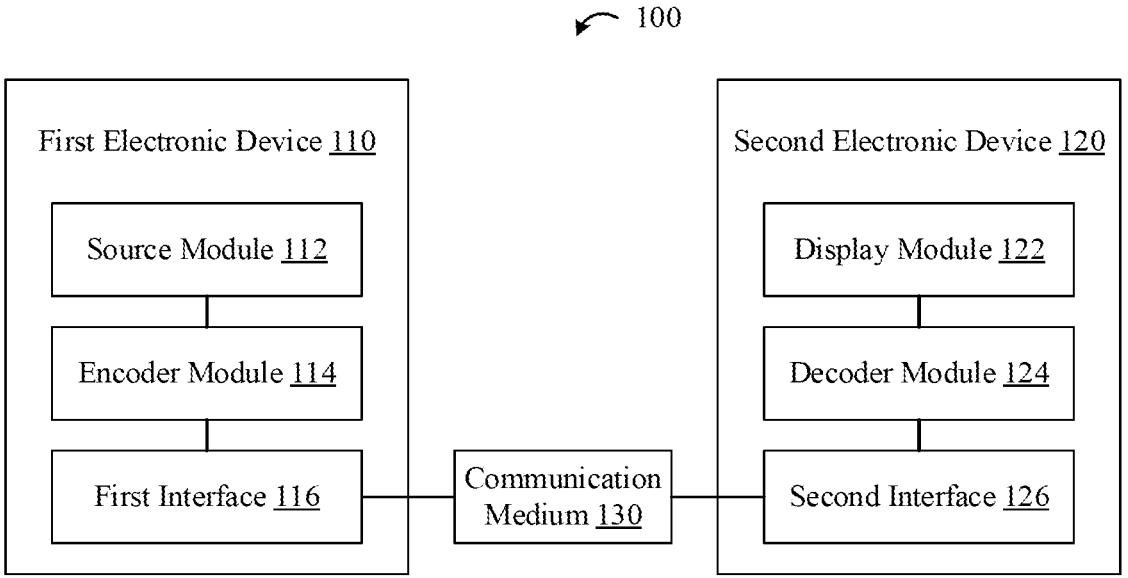
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
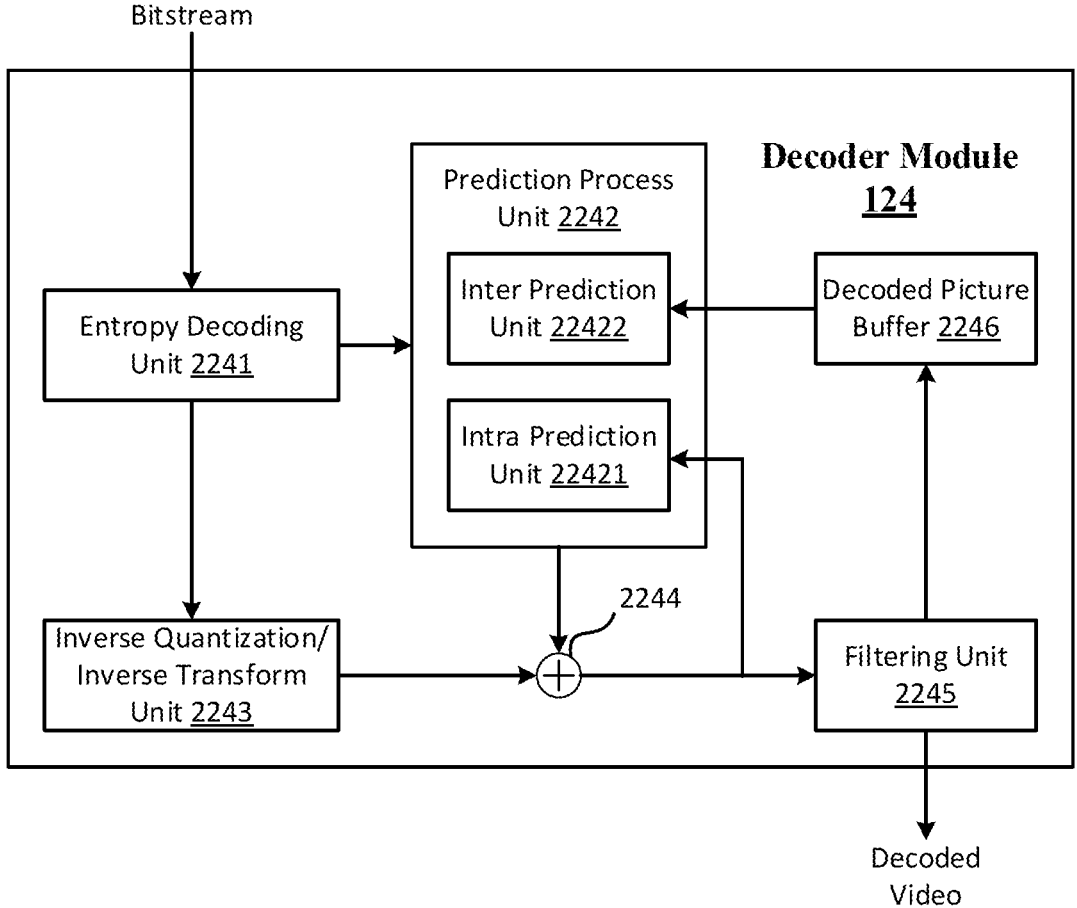
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
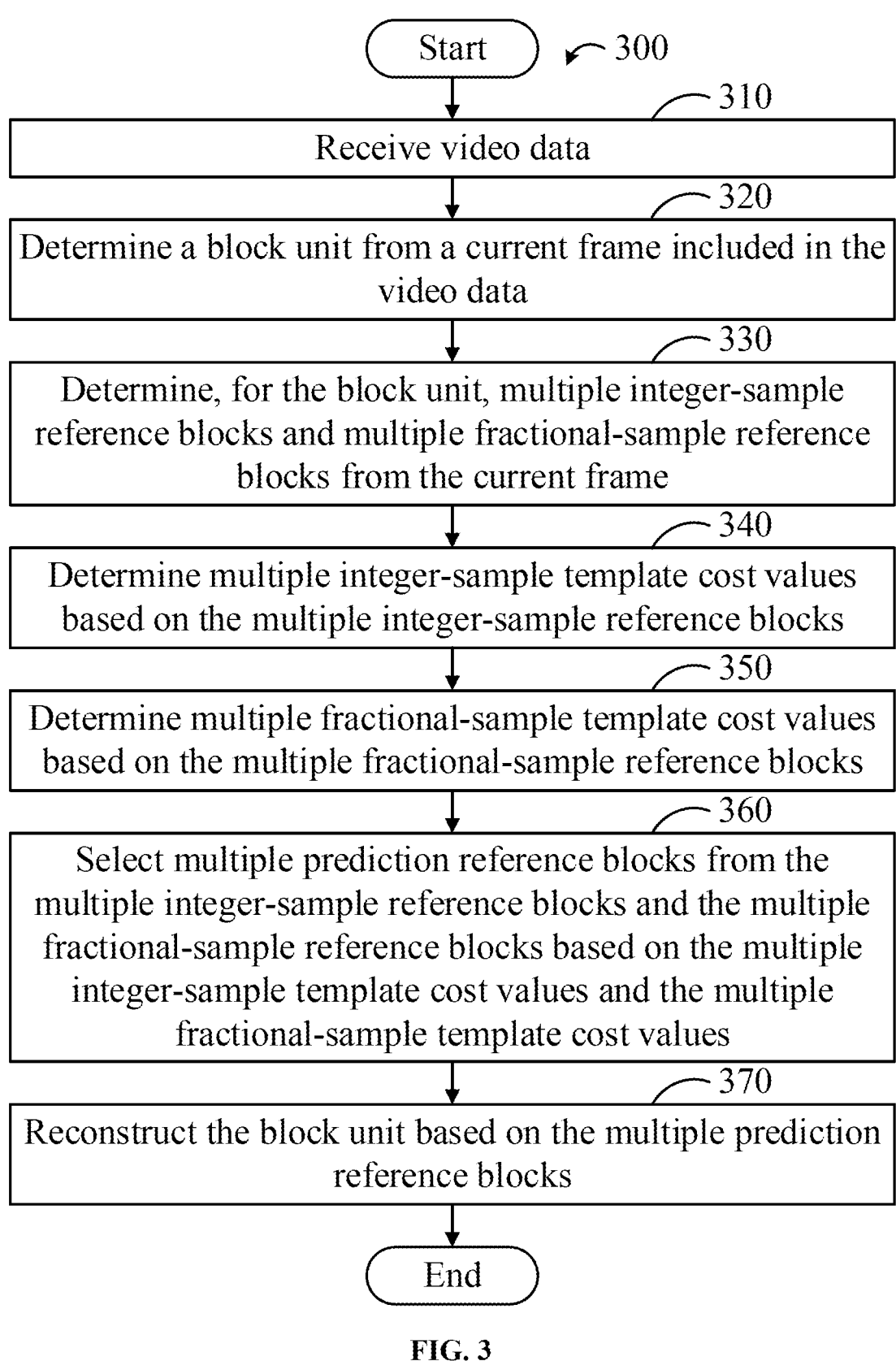
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there are a variety of ways of decoding the video data.

The method/process 300 may be performed by an electronic device using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 320, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to partition indications in the bitstream. For example, the decoder module 124 may divide the current frame to generate multiple CTUs, and further divide a current CTU included in the CTUs to generate multiple divided blocks and to determine the block unit from the divided blocks according to the partition indications based on any video coding standard. The size of the block unit may be Wb×Hb. In some implementations, the values Wb and Hb may be positive integers (e.g., 4, 8, etc.) that may be equal to, or different from, each other.

At block 330, the decoder module 124 determines, for the block unit, multiple integer-sample reference blocks and multiple fractional-sample reference blocks from the current frame.

The decoder module 124 may determine, from the current frame, a reference area of the block unit. The reference area may be reconstructed prior to reconstructing the block unit. The reference area may include multiple reconstructed samples reconstructed prior to reconstructing the block unit.

The decoder module 124 may determine, from the current frame, multiple search regions based on a location and the size of the block unit. The search regions of the block unit may be determined from the reference area of the current frame. The search regions of the block unit may be included in the current CTU that includes the block unit and multiple neighboring CTUs neighboring the current CTU. The current CTU and the neighboring CTUs may be included in the reference area of the current frame. The neighboring CTUs may include one or more of a first neighboring CTU located at a top-left side of the current CTU, a second neighboring CTU located above the current CTU, a third neighboring CTU located at an above-right side of the current CTU, and a fourth neighboring CTU located at a left side of the current CTU.

Figure 4A:
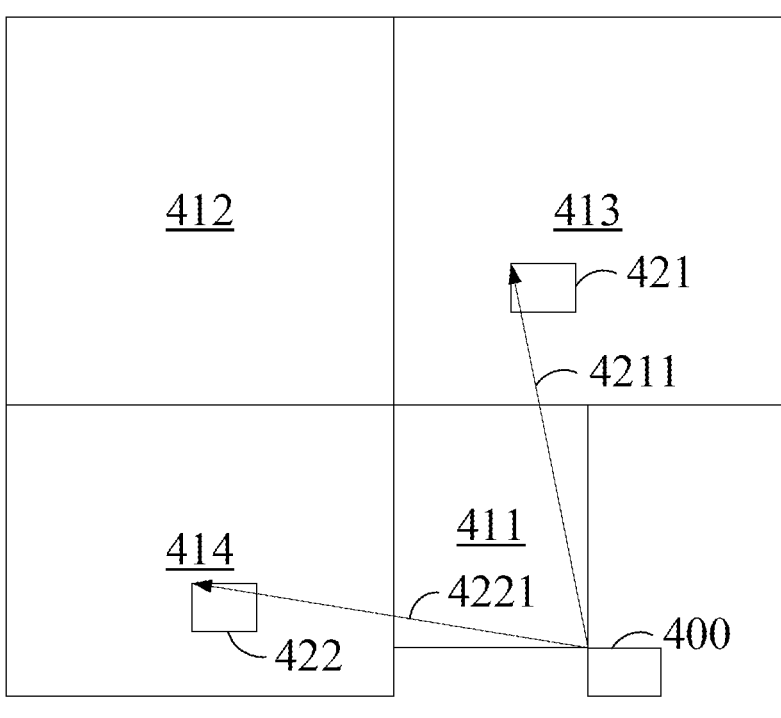
FIGS. 4A-4B are schematic illustrations of a block unit and multiple search regions, in accordance with one or more example implementations of this disclosure.
Figure 4B:
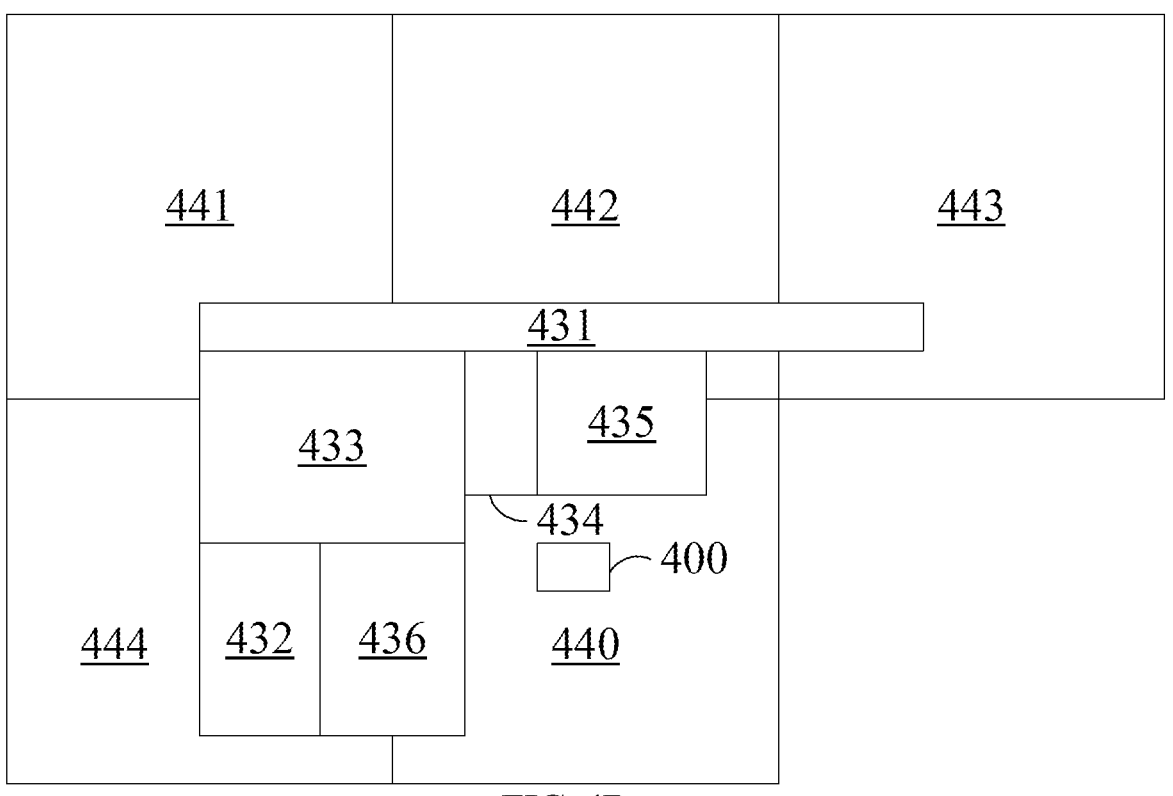

FIGS. 4A-4B are schematic illustrations of a block unit and multiple search regions, in accordance with one or more example implementations of this disclosure. In FIG. 4A, the block unit 400 may have multiple search regions 411-414. The search region 411 may be a first search region located at a top-left side of the block unit 400 and included in the current CTU. The search region 412 may be a second search region located at a top-left side of the first search region 411 and included in the first neighboring CTU located at the top-left side of the current CTU. The search region 413 may be a third search region located above the first search region 411 and included in the second neighboring CTU located above the current CTU. The search region 414 may be a fourth search region located at a left side of the first search region 411 and included in the fourth neighboring CTU located at the left side of the current CTU.

In FIG. 4B, the block unit 400 may have multiple search regions 431-436. The search region 431 may be a first search region located over the block unit 400 and included in the first neighboring CTU 441, the second neighboring CTU 442, and the third neighboring CTU 443. The search region 432 may be a second search region located neighboring a left side of the block unit 400 and included in the fourth neighboring CTU 444. The search region 433 may be a third search region located neighboring the top-left side of the block unit 400, located above the search region 432, and included in the current CTU 440, the first neighboring CTU 441, the second neighboring CTU 442, and the fourth neighboring CTU 444. The search region 434 may be a fourth search region located over the top-left side of the block unit 400, located at a right side of the search region 433, and included in the current CTU 440 and the second neighboring CTU 442. The search region 435 may be a fifth search region located over the block unit 400, located at a right side of the search region 434, and included in the current CTU 440 and the second neighboring CTU 442. The search region 436 may be a sixth search region located neighboring the left side of the block unit 400, located at a right side of the search region 432, and included in the current CTU 440 and the fourth neighboring CTU 444.

The size of the search regions may be Ws×Hs and be set based on the size Wb×Hb of the block unit 400. In some implementations, the width Ws of the search regions may be proportional to the width Wb of the block unit 400, and the height Hs of the search regions ma be proportional to the width Hb of the block unit 400. In some implementations, the width Ws of the search regions may be equal to a minimum width value between a first constant value and a first variable value generated by multiplying the width Wb of the block unit 400 by a second constant value. In addition, the height Hs of the search regions may be equal to a minimum height value between the first constant value and a second variable value generated by multiplying the height Hb of the block unit 400 by the second constant value. In some implementations, the first constant value may be equal to a first integer, and the second constant value may be equal to a second integer. In some implementations, the first constant value may be equal to 64, and the second constant value may be equal to 5. It should be noted that the number of search regions and the size of search regions may be changed without departing from the scope of the present disclosure.

The decoder module 124 may determine, for the block unit 400, multiple reference blocks including the integer-sample reference blocks and the fractional-sample reference blocks from the search regions (e.g., the search regions 411-412 or the search regions 431-436) in the current frame. Thus, the integer-sample reference blocks and the fractional-sample reference blocks may be determined from the reference area of the block unit. The size of the block unit 400 may be identical to the sizes of the integer-sample reference blocks and the fractional-sample reference blocks.

In some implementations, each of the integer-sample reference blocks may include some of the reconstructed samples reconstructed prior to reconstructing the block unit 400. For example, a reference block 421, as shown in FIG. 4A, may be one of the integer-sample reference blocks and have some of the reconstructed samples included in the search region 413. In addition, a reference block 422, as shown in FIG. 4A, may be another one of the integer-sample reference blocks and have some of the reconstructed samples included in the search region 414. In some implementations, a block vector 4211 may be used to direct from the block unit 400 towards the reference block 421, and a block vector 4221 may be used to direct from the block unit 400 towards the reference block 422.

In some implementations, each of the fractional-sample reference blocks may include multiple fractional-samples determined based on the reconstructed samples. Each of the fractional-samples may be determined based on the reconstructed samples in the reference area by using an interpolation filter. Thus, each of the fractional-sample reference blocks may be determined by using the interpolation filter to filter, respectively, at least one of the reconstructed samples.

In some implementations, the fractional-sample reference blocks may be determined based on a fractional precision. The fractional precision may include a half-pel precision, a quarter-pel precision, a $\frac{1}{16}$-pel precision, $\frac{1}{32}$-pel precision, and/or other fractional precisions. The fractional precision may be determined based on a precision value used in an intra template matching prediction (IntraTMP). In some implementations, a precision flag may be used to determine whether to enable the fractional precision. In some implementations, the precision flag may be included in a syntax header. A syntax level of the syntax header may be higher than, or identical to, a syntax level of a slice header. Thus, the syntax header may be one of the slice header, a tile header, a picture header, a picture parameter set (PPS), a sequence parameter set (SPS), a video parameter set (VPS), etc.

The precision flag may be included in the SPS to indicate whether the fractional precision is enabled for the IntraTMP in a sequence of the video data. For example, the fractional precision may be disabled when the precision flag is equal to 0 and the fractional precision may be enabled when the precision flag is equal to 1. In addition, the precision flag may be included in the slice header to indicate an IntraTMP precision of a current slice including the block unit. In some other implementations, values of the precision flag may further indicate different fractional precisions. For example, the integer precision and a half-pel precision may be enabled when the precision flag is equal to 1 and the integer precision, the half-pel precision, and a quarter-pel precision may be enabled when the precision flag is equal to 2. In some other implementations, the precision flag may be further used as an IntraTMP flag to indicate whether the IntraTMP is enabled. Thus, the IntraTMP may be disabled when the precision flag is equal to zero. In addition, the IntraTMP and the integer precision may be enabled and the fractional precision may be disabled when the precision flag is equal to 1. The IntraTMP, the integer precision, and the half-pel precision may be enabled when the precision flag is equal to 2. The IntraTMP, the integer precision, the half-pel precision, and the quarter-pel precision may be enabled when the precision flag is equal to 3.

Figure 5:
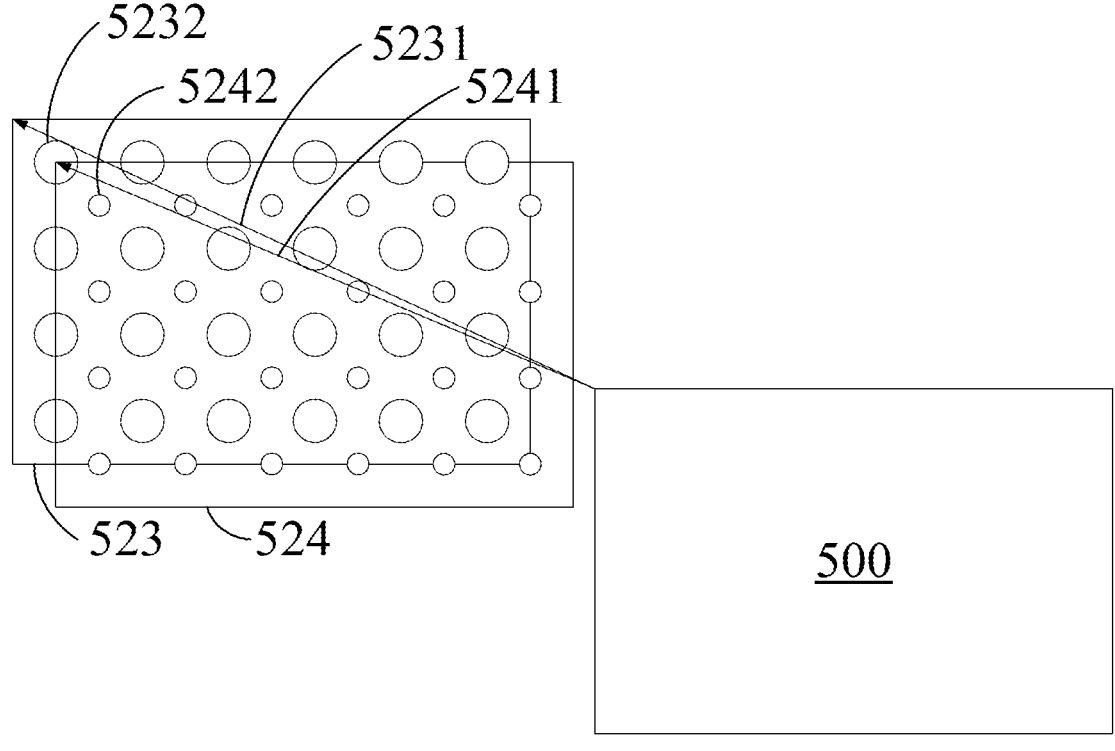
FIG. 5 is a schematic illustration of a block unit, an integer-sample reference block, and a fractional-sample reference block, in accordance with one or more example implementations of this disclosure.

Each of the integer-sample reference blocks may be located at one of multiple integer-sample positions in the current frame, and each of the fractional-sample reference blocks may be located at one of multiple fractional-sample positions in the current frame. FIG. 5 is a schematic illustration of a block unit 500, an integer-sample reference block 523, and a fractional-sample reference block 524, in accordance with one or more example implementations of this disclosure. In some implementations, a block vector 5231 may be used to have a direction from the block unit 500 towards the reference block 523, and a block vector 5241 may be used to have a direction from the block unit 500 towards the reference block 524.

The location of the integer-sample reference block 523 may be represented by an integer-sample position 5232 of a top-left sample of the integer-sample reference block 523. The location of the fractional-sample reference block 524 may be represented by a fractional-sample position 5242 of a top-left sample of the fractional-sample reference block 524. Each of the fractional-samples in the fractional-sample reference block 524 may be determined by using the interpolation filter to filter, respectively, the neighbors of the reconstructed samples. In some implementations, the top-left sample of the fractional-sample reference block 524 may be located at the fractional-sample position 5242 and determined by filtering N neighbors of the reconstructed samples in the reference area. In some implementation, the number N may be an integer, such as 2 or 4. For example, the top-left sample of the fractional-sample reference block 524 may be determined by filtering four top-left samples of the integer-sample reference block 523.

In some implementations, the decoder module 124 may perform a full search on the reference area to determine multiple initial reference blocks. In some such implementations, all of the integer-sample reference blocks may be included in the initial reference blocks during the full search. In some other implementations, all of the integer-sample reference blocks and the fractional-sample reference blocks may be included in the initial reference blocks during the full search. In yet, some other implementations, the decoder module 124 may perform a quick search (e.g., a diamond search) on the reference area to determine the initial reference blocks.

In some implementations, the decoder module 124 may sub-sample the reference area based on the block unit by a sub-sampling factor to determine the initial reference blocks. The sub-sampling factor F may be a positive integer greater than one. The sub-sampling factor F may be determined based on at least one of a predefined factor, a syntax element determined from the video data, the size of the block unit Wb×Hb, a size of the current slice, a size of reference area, or a size of the current frame. For example, the sub-sampling factor may be equal to 2, 3, 5, or any other integer. The decoder module 124 may perform a sparse search by using a sparse grid, determined from the sub-sampling factor F, to search the initial reference blocks. Since the sub-sampling factor F may be changed based on the size of the block unit, the size of the current slice, the slice of the reference area, or the size of the current frame, each divided block in the current frame may have a different sub-sampling factor F. Furthermore, the divided blocks in the different frames may also have different sub-sampling factors F. The sub-sampling factor F may be determined for the block unit from the video data.

The decoder module 124 may determine multiple intermediate reference blocks from the initial reference blocks to further perform a refinement search to determine multiple refinement reference blocks. For example, the decoder module 124 may sub-sample the reference area based on the block unit by the sub-sampling factor to determine the integer-sample reference blocks, select the intermediate reference blocks from the integer-sample reference blocks, and determine the fractional-sample reference blocks based on the intermediate reference blocks.

Referring back to FIG. 3, at block 340, the decoder module 124 determines multiple integer-sample template cost values based on the multiple integer-sample reference blocks.

Figure 6A:
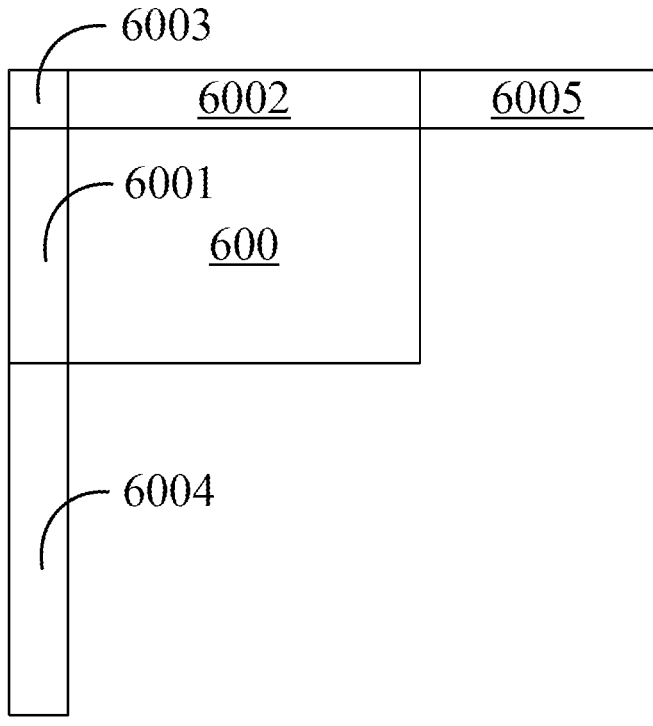
FIG. 6A is a schematic illustration of a block unit and multiple block adjacent regions, in accordance with one or more implementations of this disclosure.

With reference to FIGS. 1 and 2, the decoder module 124 may determine a block template region neighboring the block unit from the reference area of the current frame. FIG. 6A is a schematic illustration of a block unit 600 and multiple block adjacent regions 6001-6005, in accordance with one or more implementations of this disclosure. A first block adjacent region 6001 may be a left block adjacent region located at a left side of the block unit 600, a second block adjacent region 6002 may be an above block adjacent region located above the block unit 600, a third block adjacent region 6003 may be an above-left block adjacent region located at a top-left side of the block unit 600, a fourth block adjacent region 6004 may be a bottom-left block adjacent region located at a bottom-left side of the block unit 600, and a fifth block adjacent region 6005 may be an above-right block adjacent region located at an above-right side of the block unit 600. The block adjacent regions 6001-6005 may be reconstructed prior to reconstructing the block unit 600. In some implementations, the size of the block template region may be determined based on the size of the block unit 600.

The decoder module 124 may use at least one of the block adjacent regions 6001-6005 as a block template region for predicting the block unit 600. In some implementations, the decoder module 124 may use all of the block adjacent regions 6001-6005 as the block template region for predicting the block unit 600.

Figure 6B:
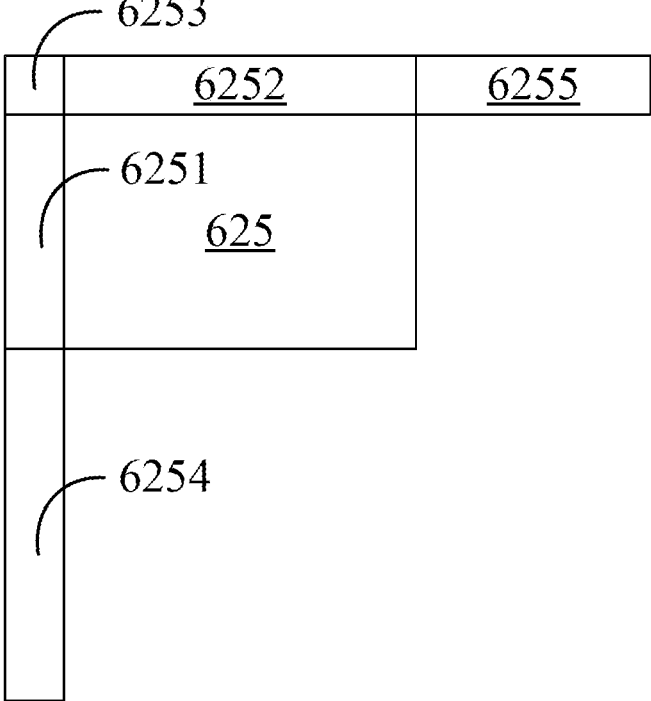
FIG. 6B is a schematic illustration of a reference block and multiple reference adjacent regions, in accordance with one or more implementations of this disclosure.

The decoder module 124 may determine multiple integer-sample template regions from the reference area of the block unit. Each of the integer-sample template regions may neighbor one of the integer-sample reference blocks. FIG. 6B is a schematic illustration of a reference block 625 and multiple reference adjacent regions 6251-6255, in accordance with one or more implementations of this disclosure. Each of the reference adjacent regions 6251-6255 may neighbor the reference block 625. The shape and the size of the reference adjacent regions 6251-6255 may be identical to the shape and the size of the block adjacent regions 6001-6005. The relative locations between the reference adjacent regions 6251-6255 and the reference block 625 may be identical to the relative locations between the block adjacent regions 6001-6005 and the block unit 600.

When the reference block 625 of the block unit 600 is one of the integer-sample reference blocks, at least one of the reference adjacent regions 6251-6255 may be determined as a corresponding one of the integer-sample template regions. The relative locations between the one of the integer-sample reference blocks and the corresponding one of the integer-sample template regions may be identical to the location between the block unit 600 and the block template region.

The shape and the size of the integer-sample template regions may be identical to the shape and the size of the block template region.

The decoder module 124 may determine the integer-sample template cost values based on the integer-sample reference blocks. Each of the integer-sample template cost values may be determined by calculating a difference between the block template region and a corresponding one of the integer-sample template regions. Since the block template region and the integer-sample template regions are reconstructed prior to reconstructing the block unit, the decoder module 124 may directly receive multiple reconstructed results of the block template region and the integer-sample template regions.

The decoder module 124 may derive the integer-sample template cost values between the block template region and the integer-sample template regions using an intra template matching. The intra template matching (TM) may be used for calculating the difference between the block template region and each of the integer-sample template regions. The reconstructed result may include the reconstructed samples having multiple reconstructed block samples of the block template region and multiple reconstructed reference samples for each of the integer-sample template regions. Thus, the integer-sample template cost value for each of the integer-sample template regions may be an integer-sample TM cost value determined by comparing the reconstructed block samples of the block template region with the reconstructed reference samples for a corresponding one of the integer-sample template regions.

The difference between the reconstructed block samples of the block template region and the reconstructed reference samples of the corresponding one of the integer-sample template regions may be calculated based on a Mean Squared Error (MSE) calculation. In addition, the difference between the block template region and each of the integer-sample template regions may be calculated based on a Sum of Absolute Difference (SAD) calculation. In some implementations, the difference between the block template region and each of the integer-sample template regions may be calculated based on a Sum of Absolute Transformed Difference (SATD) calculation. In some implementations, the difference between the block template region and each of the integer-sample template regions may be calculated based on a mean-removed sum of absolute difference (MR-SAD) calculation.

In some implementations, when the initial reference blocks are determined from the sparce search, the decoder module 124 may use the integer-sample template cost values of the initial reference blocks to determine the intermediate reference blocks. The decoder module 124 may determine M intermediate reference blocks from the initial reference blocks based on the cost values. When the initial reference blocks are the integer-sample reference blocks, the decoder module 124 may determine M intermediate reference blocks from the integer-sample reference blocks based on the integer-sample template cost values. The decoder module 124 may select M integer-sample reference blocks having M minimum values of the integer-sample template cost values. When the intermediate reference blocks are determined, the decoder module 124 may further determine the refinement reference blocks based on the intermediate reference blocks.

In some other implementations, since the initial reference blocks may be determined based on the sub-sampling factors, the refinement reference blocks may further include some integer-sample reference blocks each neighboring one of the intermediate reference blocks and different from the initial reference blocks. For example, when the sub-sampling factor F is equal to 3 and the fractional precision is the half-pel precision, the number of the refinement reference blocks for each of the intermediate reference blocks may be equal to 5×5.

Referring back to FIG. 3, at block 350, the decoder module 124 determines multiple fractional-sample template cost values based on the multiple fractional-sample reference blocks.

With reference to FIGS. 1 and 2, the decoder module 124 may determine multiple fractional-sample template regions from the reference area of the block unit. Each of the fractional-sample template regions may neighbor one of the fractional-sample reference blocks.

With reference to FIG. 6B, when the reference block 625 of the block unit 600 is one of the fractional-sample reference blocks, at least one of the reference adjacent regions 6251-6255 may be determined as a corresponding one of the fractional-sample template regions. The relative locations between the one of the fractional-sample reference blocks and the corresponding one of the fractional-sample template regions may be identical to the relative locations between the block unit 600 and the block template region. The shape and the size of the fractional-sample template regions may be identical to the shape and the size of the block template region.

The decoder module 124 may determine the fractional-sample template cost values based on the fractional-sample reference blocks. Each of the fractional-sample template cost values may be determined by calculating a difference between the block template region and a corresponding one of the fractional-sample template regions.

The decoder module 124 may derive the fractional-sample template cost values between the block template region and the fractional-sample template regions by the intra template matching. The intra TM may be used for calculating the difference between the block template region and each of the fractional-sample template regions. Since the reconstructed result may include the reconstructed samples having the reconstructed reference samples for the integer-sample template regions, each of the fractional-sample reference blocks may be determined by using an interpolation filter to filter, respectively, at least one of the reconstructed reference samples to generate multiple interpolated samples. Thus, the fractional-sample template cost value for each of the fractional-sample template regions may be a fractional-sample TM cost value determined by comparing the reconstructed block samples of the block template region with the interpolated samples for a corresponding one of the fractional-sample template regions. The interpolation filter may include multiple interpolation filter coefficients fC and fG.

The difference between the reconstructed block samples of the block template region and the interpolated samples of a corresponding one of the fractional-sample template regions may be calculated based on the MSE calculation. In addition, the difference between the block template region and each of the fractional-sample template regions may be calculated based on the SAD calculation. In some implementations, the difference between the block template region and each of the fractional-sample template regions may be calculated based on the SATD calculation. In some implementations, the difference between the block template region and each of the fractional-sample template regions may be calculated based on the MR-SAD calculation.

Referring back to FIG. 3, at block 360, the decoder module 124 selects multiple prediction reference blocks from the multiple integer-sample reference blocks and the multiple fractional-sample reference blocks based on the multiple integer-sample template cost values and the multiple fractional-sample template cost values.

With reference to FIGS. 1 and 2, the decoder module 124 may determine an arrangement of the integer-sample reference blocks and the fractional-sample reference blocks based on the integer-sample template cost values and the fractional-sample template cost values, and select the prediction reference blocks based on the determined arrangement of the integer-sample reference blocks and the fractional-sample reference blocks. In some implementations, at least one of the prediction reference blocks may be selected from the fractional-sample reference blocks.

The decoder module 124 may reorder the integer-sample reference blocks and the fractional-sample reference blocks based on the determined arrangement. In some implementations, the integer-sample reference blocks and the fractional-sample reference blocks may be reordered in an ascending order or a descending order of the integer-sample template cost values and the fractional-sample template cost values.

Before the arrangement is determined based on the integer-sample template cost values and the fractional-sample template cost values, the integer-sample reference blocks and the fractional-sample reference blocks may be ordered based on one or more arbitrary rules. The integer-sample reference blocks and the fractional-sample reference blocks may be reordered in the ascending order of the integer-sample template cost values and the fractional-sample template cost values. Thus, when the integer-sample template cost value of a specific one of the integer-sample reference blocks is less than the integer-sample template cost values of the other integer-sample reference blocks and all of the fractional-sample template cost values, the specific integer-sample reference block may be moved forward to be a first reference block based on the determined arrangement. In other words, the specific integer-sample reference block may be moved to be the first reference block when the integer-sample template cost value of the specific integer-sample reference block is the minimum value of the integer-sample template cost values and the fractional-sample template cost values.

In addition, the specific integer-sample reference block may be moved to be the last one of the reference blocks when the integer-sample template cost value of the specific integer-sample reference block is the maximum value of the integer-sample template cost values and the fractional-sample template cost values. When the fractional-sample template cost value of a specific one of the fractional-sample reference blocks is less than the fractional-sample template cost values of the other fractional-sample reference blocks and all of the integer-sample template cost values, the specific fractional-sample reference block may be moved forward to be a first reference block based on the determined arrangement. For example, the integer-sample reference blocks may include three integer-sample reference blocks IB1, IB2, and IB3 having, respectively, three integer-sample template cost values IC1, IC2, and IC3. In addition, the fractional-sample reference blocks may include three fractional-sample reference blocks FB1, FB2, and FB3 having, respectively, three fractional-sample template cost values FC1, FC2, and FC3. When a value order of the three integer-sample template cost values and the three fractional-sample template cost values is IC3>FC2>IC1>FC3>IC2>FC1, the determined arrangement of the integer-sample reference blocks and the fractional-sample reference blocks may be changed from an original order of the integer-sample reference blocks IB1, IB2, and IB3 and the fractional-sample reference blocks FB1, FB2, and FB3 to a new order of the six reference blocks FB1, IB2, FB3, IB1, FB2, and IB3.

The arrangement may be further determined by adjusting the new order of the integer-sample reference blocks and the fractional-sample reference blocks based on a diversity criterion. The decoder module 124 may determine a difference value between two of the integer-sample template cost values and the fractional-sample template cost values selected from two neighbors of the integer-sample reference blocks and the fractional-sample reference blocks ordered in the new order. When the difference value is less than or equal to a diversity threshold, the last one of the two neighbors of the integer-sample reference blocks and the fractional-sample reference blocks may be moved backward.

The decoder module 124 may select K reference blocks having the least cost values from the integer-sample reference blocks and the fractional-sample reference blocks and add the selected reference blocks to a reference list. The number K, being a positive integer, may be equal to the number of the integer-sample reference blocks and the fractional-sample reference blocks in the reference list, and less than the total number of the integer-sample reference blocks and the fractional-sample reference blocks. In other words, the decoder module 124 may select the first to the K-th reference blocks ordered based on the determined arrangement when the integer-sample reference blocks and the fractional-sample reference blocks are reordered in the ascending order of the integer-sample template cost values and the fractional-sample template cost values to generate the determined arrangement. Each of the integer-sample reference blocks and the fractional-sample reference blocks in the reference list may have a reference index value. Thus, the reference index values for the reference list may be within an index range of 0 to K−1 since the number of the integer-sample reference blocks and the fractional-sample reference blocks in the reference list is equal to K.

The decoder module 124 may determine the prediction reference blocks from the integer-sample reference blocks and the fractional-sample reference blocks based on at least one of the determined arrangement or multiple reference block indices of the block unit determined based on the bitstream. The reference block indices may include multiple indications (e.g., intra TMP_idx0 and intra TMP_idx1). In some implementations, the multiple minimum values of the integer-sample template cost values and the fractional-sample template cost values may be determined, and then the integer-sample reference blocks and the fractional-sample reference blocks corresponding to the multiple minimum values of the integer-sample template cost values and the fractional-sample template cost values may be directly determined as the prediction reference blocks without parsing the reference block indices. Thus, the number of bits in the bitstream may be reduced.

In some implementations, at least one of the prediction reference blocks may be selected from the fractional-sample reference blocks. Thus, at least one minimum value of the fractional-sample template cost values may be determined, and then at least one of the fractional-sample reference blocks corresponding to the at least one minimum value of the fractional-sample template cost values may be directly determined as the at least one of the prediction reference blocks without parsing the reference block indices. In addition, zero or more minimum values of the integer-sample template cost values may be determined, and then zero or more of the integer-sample reference blocks corresponding to the zero or more minimum values of the integer-sample template cost values may be directly determined as the other prediction reference blocks without parsing the reference block indices. In some implementations, the number of the zero or more of the integer-sample reference blocks may be determined based on the number of the prediction reference blocks and the number of the at least one of the fractional-sample reference blocks. For example, when all of the prediction reference blocks are selected from the fractional-sample reference blocks, the number of the integer-sample reference blocks included in the prediction reference blocks may be equal to zero.

In some implementations, the integer-sample reference blocks and the fractional-sample reference blocks arranged based on the determined arrangement may be divided into multiple reference block groups. In some implementations, the reference block index may be parsed for the block unit for selecting one of the reference block groups. Thus, all of the prediction reference blocks may be included in the selected one of the reference block groups. In some other implementations, the reference list including the selected reference blocks may be divided into multiple listed block groups. The reference block index may be parsed for the block unit for selecting one of the listed block groups. Thus, all of the prediction reference blocks may be included in the one of the listed block groups.

In some implementations, the reference block indices may be parsed for the block unit for selecting the prediction reference blocks from the integer-sample reference blocks and the fractional-sample reference blocks arranged based on the determined arrangement. In some implementations, the reference block indices may be parsed for the block unit for selecting the prediction reference blocks from the reference list. In some implementations, the reference block having a lower cost value may have a lower reference index value. Thus, since the reference block having a lower cost value may be more easily selected than the reference block having a higher cost value, the number of bits in the bitstream may also be reduced.

In some implementations, at least one of the prediction reference blocks may be selected from the fractional-sample reference blocks. Thus, at least one of the reference block indices may be parsed for the block unit for selecting the at least one of the prediction reference blocks only from the fractional-sample reference blocks arranged based on the determined arrangement. In addition, the other reference block indices may be parsed for the block unit for selecting the other prediction reference blocks only from the integer-sample reference blocks arranged based on the determined arrangement. In some implementations, one of the reference block indices may be parsed for the block unit for selecting one of the prediction reference blocks only from the fractional-sample reference blocks arranged based on the determined arrangement. In addition, the other reference block indices may be parsed for the block unit for selecting the other prediction reference blocks from the integer-sample reference blocks and the fractional-sample reference blocks arranged based on the determined arrangement.

Referring back to FIG. 3, at block 370, the decoder module 124 reconstructs the block unit based on the multiple prediction reference blocks.

With reference to FIGS. 1 and 2, the decoder module 124 may determine multiple weighting parameters based on the integer-sample template cost values and the fractional-sample template cost values for the prediction reference blocks. The decoder module 124 may compare the integer-sample template cost values and the fractional-sample template cost values of the prediction reference blocks to determine the weighting parameters. For example, the number of the prediction reference blocks may be equal to Nb, where the number Nb may be a positive integer greater than 1. Thus, the weighting parameters of the Nb prediction reference blocks may be determined based on the following functions:

$$w_{RBi} = \frac{(RC_1 + RC_2 + \ldots + RC_{Nb}) - RC_i}{(Nb - 1)(RC_1 + RC_2 + \ldots + RC_{Nb})}$$

where the numbers $w_{RBi}$ is a weighting parameter of i-th prediction reference block, $RC_1$, $RC_2$, . . . , and $RC_N$ are the cost values of the prediction reference blocks, and the number i are less than or equal to the number Nb. When the i-th prediction reference block is one of the integer-sample reference blocks, the cost value of the i-th prediction reference block is one of the integer-sample template cost values corresponding to the one of the integer-sample reference blocks. When the i-th prediction reference block is one of the fractional-sample reference blocks, the cost value of the i-th prediction reference block is one of the fractional-sample template cost values corresponding to the one of the fractional-sample reference blocks.

The decoder module 124 may predict the block unit based on the prediction reference blocks and the weighting parameters. The decoder module 124 may weightedly combine the prediction reference blocks to determine a predicted block of the block unit based on the prediction reference blocks and the weighting parameters.

The decoder module 124 may reconstruct the block unit based on the predicted block. The decoder module 124 may determine multiple residual components from the bitstream for the block unit and add the residual components into the predicted block to reconstruct the block unit. The decoder module 124 may reconstruct all of the other block units in the image frame for reconstructing the image frame and the video. The method/process 300 may then end.

Figure 7:
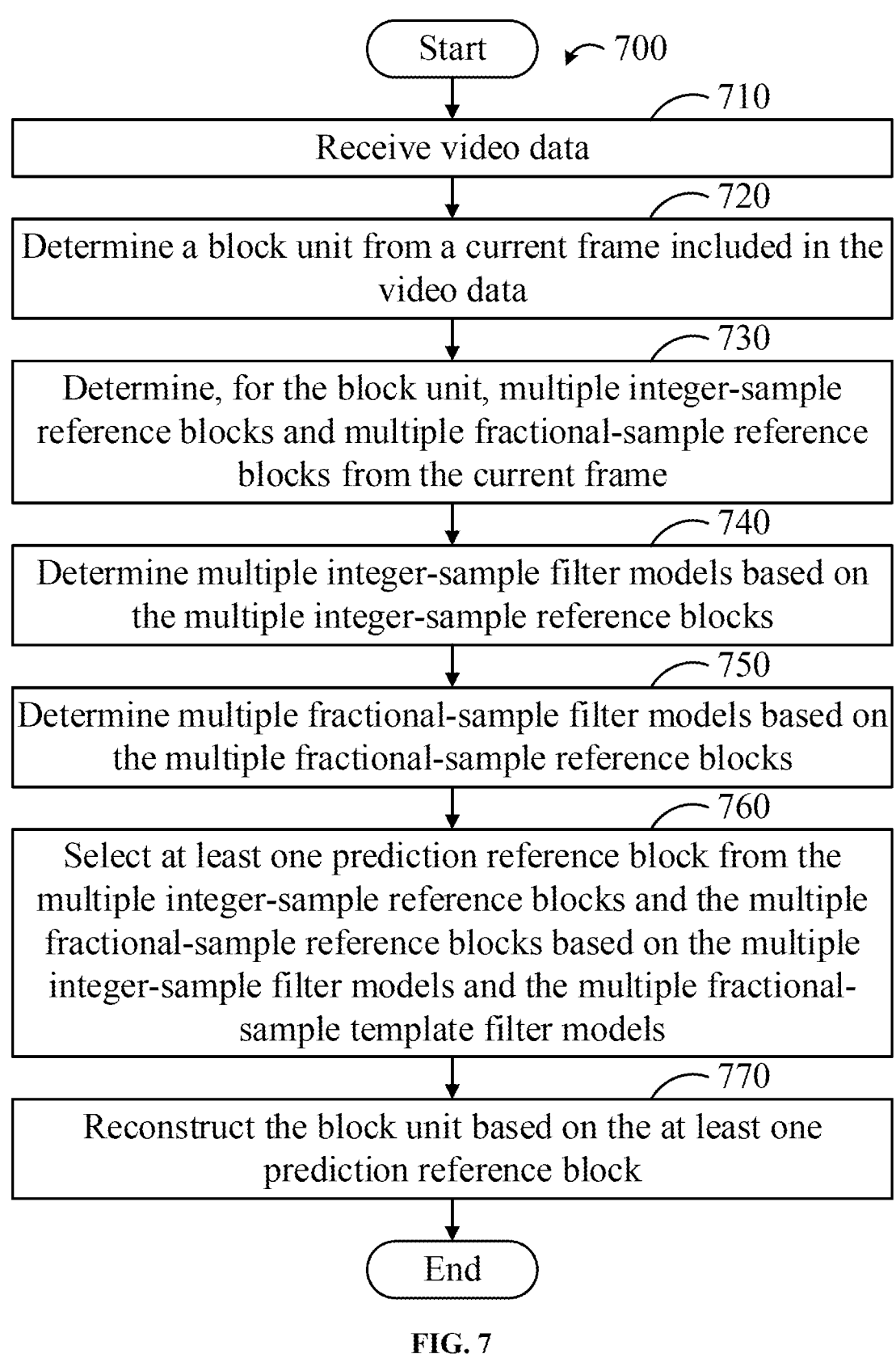
FIG. 7 is a flowchart illustrating a method/process for decoding and/or encoding video data by an electronic device, in accordance with one or more example implementations of this disclosure.

FIG. 7 is a flowchart illustrating a method/process 700 for decoding and/or encoding video data by an electronic device, in accordance with one or more example implementations of this disclosure. The method/process 700 is an example implementation, as there are a variety of ways of decoding the video data.

The method/process 700 may be performed by an electronic device using the configurations illustrated in FIGS. 1 and 2, where various elements of these figures may be referenced to describe the method/process 700. Each block illustrated in FIG. 7 may represent one or more processes, methods, or subroutines performed by an electronic device.

The order in which the blocks appear in FIG. 7 is for illustration only, and may not be construed to limit the scope of the present disclosure, thus may be different from what is illustrated. Additional blocks may be added or fewer blocks may be utilized without departing from the scope of the present disclosure.

At block 710, the method/process 700 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers)

via the second interface 126. The second interface 126 may provide the bitstream to the decoder module 124.

At block 720, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to partition indications in the bitstream. For example, the decoder module 124 may divide the current frame to generate multiple CTUs, and further divide a current CTU included in the CTUs to generate multiple divided blocks and to determine the block unit from the divided blocks according to the partition indications based on any video coding standard. The size of the block unit may be WbxHb. In some implementations, the values Wb and Hb may be positive integers (e.g., 4, 8, etc.) that may be equal to, or different from, each other.

At block 730, the decoder module 124 determines, for the block unit, multiple integer-sample reference blocks and multiple fractional-sample reference blocks from the current frame.

The decoder module 124 may determine, from the current frame, a reference area of the block unit. The reference area may be reconstructed prior to reconstructing the block unit. The reference area may include multiple reconstructed samples reconstructed prior to reconstructing the block unit.

The decoder module 124 may determine, from the current frame, multiple search regions based on a location and the size of the block unit. The search regions of the block unit may be determined from the reference area of the current frame. The search regions of the block unit may be included in the current CTU including the block unit and multiple neighboring CTUs neighboring the current CTU. The current CTU and the neighboring CTUs may be included in the reference area of the current frame. The neighboring CTUs may include one or more of a first neighboring CTU located at a top-left side of the current CTU, a second neighboring CTU located above the current CTU, a third neighboring CTU located at an above-right side of the current CTU, and a fourth neighboring CTU located at a left side of the current CTU.

With reference to FIG. 4A, the search regions of the block unit 400 may include the search regions 411-414. With reference to FIG. 4B, the search regions of the block unit 400 may include the search regions 431-435. The search regions of the block unit of the method/process 700 may be identical to the search regions of the block unit of the method/process 300. In other words, the search regions of the block unit at block 730 may be identical to the search regions of the block unit at block 330. It should be noted that the number of search regions and the size of search regions may be changed without departing from the scope of the present disclosure.

The decoder module 124 may determine, for the block unit 400, multiple reference blocks including the integer-sample reference blocks and the fractional-sample reference blocks from the search regions (e.g., the search regions 411-412 or the search regions 431-436) in the current frame. Thus, the integer-sample reference blocks and the fractional-sample reference blocks may be determined from the reference area of the block unit. The size of the block unit 400 may be identical to the sizes of the integer-sample reference blocks and the fractional-sample reference blocks.

In some implementations, each of the integer-sample reference blocks may include some of the reconstructed samples reconstructed prior to reconstructing the block unit. In some implementations, each of the fractional-sample reference blocks may include multiple fractional-samples determined based on the reconstructed samples. Each of the fractional-samples may be determined based on the reconstructed samples in the reference area by using an interpolation filter. Thus, each of the fractional-sample reference blocks may be determined by using the interpolation filter to filter, respectively, at least one of the reconstructed samples.

In some implementations, the fractional-sample reference blocks may be determined based on a fractional precision. The fractional precision may include a half-pel precision, a quarter-pel precision, a $\frac{1}{16}$-pel precision, $\frac{1}{32}$-pel precision, and/or other fractional precisions. The fractional precision may be determined based on a precision value used in an intra template matching prediction (IntraTMP). In some implementations, a precision flag may be used to determine whether to enable the fractional precision. In some implementations, the precision flag may be included in a syntax header. A syntax level of the syntax header may be higher than, or identical to, a syntax level of a slice header. The precision flag of the method/process 700 may be identical to the precision flag of the method/process 300. In other words, the precision flag at block 730 may be identical to the precision flag at block 330.

Each of the integer-sample reference blocks may be located at one of multiple integer-sample positions in the current frame, and each of the fractional-sample reference blocks may be located at one of multiple fractional-sample positions in the current frame. With reference to FIG. 5, the location of the integer-sample reference block 523 may be represented by an integer-sample position 5232 of a top-left sample of the integer-sample reference block 523. In addition, the location of the fractional-sample reference block 524 may be represented by a fractional-sample position 5242 of a top-left sample of the fractional-sample reference block 524. Each of the fractional-samples in the fractional-sample reference block 524 may be determined by using the interpolation filter to filter, respectively, the neighbors of the reconstructed samples. In some implementations, the top-left sample of the fractional-sample reference block 524 may be located at the fractional-sample position 5242 and determined by filtering N neighbors of the reconstructed samples in the reference area. In some implementation, the number N may be an integer, such as 2 or 4. For example, the top-left sample of the fractional-sample reference block 524 may be determined by filtering four top-left samples of the integer-sample reference block 523.

In some implementations, the decoder module 124 may perform a full search on the reference area to determine multiple initial reference blocks. In some such implementations, all of the integer-sample reference blocks may be included in the initial reference blocks during the full search. In some other implementations, all of the integer-sample reference blocks and the fractional-sample reference blocks may be included in the initial reference blocks during the full search. In yet, some other implementations, the decoder module 124 may perform a quick search (such as a diamond search) on the reference area to determine the initial reference blocks.

In some implementations, the decoder module 124 may sub-sample the reference area based on the block unit by a sub-sampling factor to determine the initial reference blocks. The sub-sampling factor F may be a positive integer greater than one. The sub-sampling factor F may be determined based on at least one of a predefined factor, a syntax element determined from the video data, the size of the block unit Wb×Hb, a size of the current slice, a size of the reference area, or a size of the current frame. For example, the sub-sampling factor may be equal to 2, 3, 5, or any other integer. The decoder module 124 may perform a sparse search by using a sparse grid, determined from the sub-sampling factor F, to search the initial reference blocks. Since the sub-sampling factor F may be changed based on the size of the block unit, the size of the current slice, the slice of the reference area, or the size of the current frame, each divided block in the current frame may have different sub-sampling factors F. Furthermore, the divided blocks in the different frames may also have different sub-sampling factors F. The sub-sampling factor F may be determined for the block unit from the video data.

The decoder module 124 may determine multiple intermediate reference blocks from the initial reference blocks to further perform a refinement search to determine multiple refinement reference blocks. For example, the decoder module 124 may sub-sample the reference area based on the block unit by the sub-sampling factor to determine the integer-sample reference blocks, select the intermediate reference blocks from the integer-sample reference blocks, and determine the fractional-sample reference blocks based on the intermediate reference blocks.

Referring back to FIG. 7, at block 740, the decoder module 124 determines multiple integer-sample filter models based on the multiple integer-sample reference blocks.

With reference to FIGS. 1 and 2, the decoder module 124 may determine a block template region neighboring the block unit from the reference area of the current frame. With reference to FIG. 6A, the decoder module 124 may determine the block adjacent regions 6001-6003 as a block template region of a block unit 600.

In addition, the decoder module 124 may determine multiple reference template regions each neighboring one of the reference blocks from the reference area of the current frame. The reference blocks may include the integer-sample reference blocks. When one of the reference blocks is one of the integer-sample reference blocks, one of the reference template regions corresponding to the one of the reference blocks may be one of multiple integer-sample template regions corresponding to the one of the integer-sample reference blocks.

With reference to FIG. 6B, the decoder module 124 may further determine the reference adjacent regions 6251-6253, as a reference template region of a reference block 625. In some implementations, the heights of the block adjacent regions 6002 and 6003 may be equal to the heights of the reference adjacent regions 6252 and 6253. In addition, the widths of the block adjacent regions 6001 and 6003 may be equal to the widths of the reference adjacent regions 6251 and 6253. In some implementation, the heights of the block adjacent regions 6002 and 6003 and the heights of the reference adjacent regions 6252 and 6253 may be equal to 4. In some implementation, the widths of the block adjacent regions 6001 and 6003 and the widths of the reference adjacent regions 6251 and 6253 may be equal to 4.

When the reference block 625 of the block unit 600 is one of the integer-sample reference blocks, the reference adjacent regions 6251-6253 may be determined as a corresponding one of the integer-sample template regions corresponding to the one of the integer-sample reference blocks.

Since the block template region and the integer-sample template regions are reconstructed prior to reconstructing the block unit, the decoder module 124 may directly receive multiple reconstructed samples including multiple reconstructed block samples of the block template region and multiple reconstructed reference samples for each of the integer-sample template regions.

The decoder module 124 may determine multiple reference filter models for the reference blocks. Each of the reference filter models may be determined based on a corresponding one of the reference template regions. Each of the reference filter models may include multiple trained parameters. The trained parameters may be determined for each of the reference filter models by the trained filter mode. The trained filter mode may be used for the calculation by minimizing a mean squared error between the reconstructed block samples in the block template region and the reconstructed reference samples in each of the reference template regions. The reference filter models may be shown as follows:

$$predVal = C_0 \times C + C_1 \times N + C_2 \times S + C_3 \times E + C_4 \times W + C_5 \times B$$

where C is a sample value of a center reference sample to be filter, N is a sample value of a north reference sample located above the center reference sample, S is a sample value of a south reference sample located below the center reference sample, E is a sample value of an cast reference sample located at a right side of the center reference sample, W is a sample value of a west reference sample located at a left side of the center reference sample, B is a bias term, $C_0, C_1, \ldots,$ and $C_5$ is the trained parameters, predVal is a predicted value of a center block sample corresponding to the center reference sample. In some implementations, equation of the reference filter models shown in the method/process 700 is for illustration only, and may not be intended to limit the scope of the present disclosure, thus may be different from what is illustrated. Additional terms may be added or fewer terms may be utilized without departing from the scope of the present disclosure.

The reference filter models may include the integer-sample filter models, since the reference blocks include the integer-sample reference blocks. After the trained parameters are derived by the trained filter mode for each of the integer-sample filter models, the decoder module 124 may predict the block template region to generate multiple integer-sample predicted regions based on the integer-sample filter models and the integer-sample template regions. Each of the integer-sample predicted regions may include multiple integer-sample predicted samples determined by inputting the reconstructed reference samples in one of the integer-sample reference blocks to a corresponding one of the integer-sample filter models.

The decoder module 124 may then determine multiple integer-sample template cost values based on the block template region and the integer-sample predicted regions. Each of the integer-sample template cost values may be determined by calculating a difference between the block template region and a corresponding one of the integer-sample predicted regions.

The difference between the reconstructed block samples of the block template region and the integer-sample predicted samples of the corresponding one of the integer-sample predicted regions may be calculated based on a Mean Squared Error (MSE) calculation. In addition, the difference between the block template region and each of the integer-sample predicted regions may be calculated based on a Sum of Absolute Difference (SAD) calculation. In some implementations, the difference between the block template region and each of the integer-sample predicted regions may be calculated based on a Sum of Absolute Transformed Difference (SATD) calculation. In some implementations, the difference between the block template region and each of the integer-sample predicted regions may be calculated based on a mean-removed sum of absolute difference (MR-SAD) calculation.

In some implementations, when the initial reference blocks are determined from the sparce search, the decoder module 124 may use the integer-sample template cost values of the initial reference blocks to determine the intermediate reference blocks. The decoder module 124 may determine M intermediate reference blocks from the initial reference blocks based on the cost values. When the initial reference blocks are the integer-sample reference blocks, the decoder module 124 may determine M intermediate reference blocks from the integer-sample reference blocks based on the integer-sample template cost values. The decoder module 124 may select M integer-sample reference blocks having M minimum values of the integer-sample template cost values. When the intermediate reference blocks are determined, the decoder module 124 may further determine the refinement reference blocks based on the intermediate reference blocks.

In some other implementations, since the initial reference blocks may be determined based on the sub-sampling factors, the refinement reference blocks may further include some integer-sample reference blocks, each neighboring one of the intermediate reference blocks, and different from the initial reference blocks. For example, when the sub-sampling factor F is equal to 3 and the fractional precision is the half-pel precision, the number of the refinement reference blocks for each of the intermediate reference blocks may be equal to 5×5.

Referring back to FIG. 7, at block 750, the decoder module 124 determines multiple fractional-sample filter models based on the multiple fractional-sample reference blocks.

The reference blocks may include the fractional-sample reference blocks. When one of the reference blocks is one of the fractional-sample reference blocks, one of the reference template regions corresponding to the one of the reference blocks may be one of multiple fractional-sample template regions corresponding to the one of the fractional-sample reference blocks. With reference to FIG. 6B, when the reference block 625 of the block unit 600 is one of the fractional-sample reference blocks, the reference adjacent regions 6251-6253 may be determined as a corresponding one of the fractional-sample template regions corresponding to the one of the fractional-sample reference blocks.

Since the block template region and the integer-sample template regions are reconstructed prior to reconstructing the block unit, with reference to FIGS. 1 and 2, the decoder module 124 may directly receive the reconstructed samples including the reconstructed block samples of the block template region and the reconstructed reference samples for the integer-sample template regions. Then, each of the fractional-sample reference blocks may be determined by using an interpolation filter to filter, respectively, at least one of the reconstructed reference samples to generate multiple interpolated samples. The interpolation filter may include multiple interpolation filter coefficients fC and fG.

The decoder module 124 may determine the reference filter models for the reference blocks. Each of the reference filter models may be determined based on a corresponding one of the reference template regions. Each of the reference filter models may include multiple trained parameters. The trained parameters may be determined for each of the reference filter models by the trained filter mode. The trained filter mode may be used for the calculation by minimizing the mean squared error between the reconstructed block samples in the block template region and the reconstructed reference samples in each of the reference template regions.

The reference filter models may include the fractional-sample filter models since the reference blocks include the fractional-sample reference blocks. After the trained parameters are derived by the trained filter mode for each of the fractional-sample filter models, the decoder module 124 may predict the block template region to generate multiple fractional-sample predicted regions based on the fractional-sample filter models and the fractional-sample template regions. Each of the fractional-sample predicted regions may include multiple fractional-sample predicted samples determined by inputting the interpolated samples in one of the fractional-sample reference blocks to a corresponding one of the fractional-sample filter models.

The decoder module 124 may determine multiple fractional-sample template cost values based on the block template region and the fractional-sample predicted regions. Each of the fractional-sample template cost values may be determined by calculating a difference between the block template region and a corresponding one of the fractional-sample predicted regions.

The difference between the reconstructed block samples of the block template region and the fractional-sample predicted samples of the corresponding one of the fractional-sample predicted regions may be calculated based on the MSE calculation. In addition, the difference between the block template region and each of the fractional-sample predicted regions may be calculated based on the SAD calculation. In some implementations, the difference between the block template region and each of the integer-sample predicted regions may be calculated based on the SATD calculation. In some implementations, the difference between the block template region and each of the integer-sample predicted regions may be calculated based on the MR-SAD calculation.

Referring back to FIG. 7, at block 760, the decoder module 124 selects at least one prediction reference block from the determined multiple integer-sample reference blocks and the determined multiple fractional-sample reference blocks based on the determined multiple integer-sample template cost values and the determined multiple fractional-sample template cost values.

With reference to FIGS. 1 and 2, the decoder module 124 may determine an arrangement of the integer-sample reference blocks and the fractional-sample reference blocks based on the integer-sample template cost values and the fractional-sample template cost values, and select the at least one prediction reference block based on the determined arrangement of the integer-sample reference blocks and the fractional-sample reference blocks.

In some implementations, the determined arrangement of the integer-sample reference blocks and the fractional-sample reference blocks in the method/process 700 may be identical to the determined arrangement of the integer-sample reference blocks and the fractional-sample reference blocks in the method/process 300. In other words, the determined arrangement of the integer-sample reference blocks and the fractional-sample reference blocks at block 760 may be identical to the determined arrangement of the integer-sample reference blocks and the fractional-sample reference blocks at block 360.

In some implementations, one or more of the prediction reference blocks may be selected from the fractional-sample reference blocks, when the number of the at least one prediction reference block is greater than 1.

The decoder module 124 may select K reference blocks having the least cost values from the integer-sample reference blocks and the fractional-sample reference blocks, and add the selected reference blocks to a reference list. The number K, being a positive integer, may be equal to the number of the integer-sample reference blocks and the fractional-sample reference blocks in the reference list and less than the total number of the integer-sample reference blocks and the fractional-sample reference blocks. In other words, the decoder module 124 may select the first to the K-th reference blocks ordered based on the determined arrangement when the integer-sample reference blocks and the fractional-sample reference blocks are reordered in the ascending order of the integer-sample template cost values and the fractional-sample template cost values to generate the determined arrangement. Each of the integer-sample reference blocks and the fractional-sample reference blocks in the reference list may have a reference index value. Thus, the reference index values for the reference list may be within an index range of 0 to K−1 since the number of the integer-sample reference blocks and the fractional-sample reference blocks in the reference list is equal to K.

The decoder module 124 may determine the at least one prediction reference block from the integer-sample reference blocks and the fractional-sample reference blocks based on at least one of the determined arrangement or at least one reference block index of the block unit determined based on the bitstream. The at least one reference block index may include at least one indication (e.g., intra TMP_idx0 and intra TMP_idx1). In some implementations, at least one minimum value of the integer-sample template cost values and the fractional-sample template cost values may be determined. Then, at least one of the integer-sample reference blocks and the fractional-sample reference blocks corresponding to the at least one minimum value of the integer-sample template cost values and the fractional-sample template cost values may be directly determined as the at least one prediction reference block without parsing the at least one reference block index. Thus, the number of bits in the bitstream may be reduced.

In some implementations, one or more of the prediction reference blocks may be selected from the fractional-sample reference blocks, when the number of the at least one prediction reference block is greater than 1. Thus, at least one minimum value of the fractional-sample template cost values may be determined, and then at least one of the fractional-sample reference blocks corresponding to the at least one minimum value of the fractional-sample template cost values may be directly determined as the at least one of the prediction reference blocks without parsing the at least one reference block index. In addition, zero or more minimum values of the integer-sample template cost values may be determined, and then zero or more of the integer-sample reference blocks corresponding to the zero or more minimum values of the integer-sample template cost values may be directly determined as the other prediction reference blocks without parsing the at least one reference block index. In some implementations, the number of the zero or more of the integer-sample reference blocks may be determined based on the number of the prediction reference blocks and the number of the at least one of the fractional-sample reference blocks. For example, when all of the prediction reference blocks are selected from the fractional-sample reference blocks, the number of the integer-sample reference blocks included in the prediction reference blocks may be equal to zero.

In some implementations, the integer-sample reference blocks and the fractional-sample reference blocks arranged based on the determined arrangement may be divided into multiple reference block groups. In some implementations, the reference block index may be parsed for the block unit for selecting one of the reference block groups. Thus, all of the prediction reference blocks may be included in the selected one of the reference block groups. In some other implementations, the reference list including the selected reference blocks may be divided into multiple listed block groups. The reference block index may be parsed for the block unit for selecting one of the listed block groups. Thus, all of the prediction reference blocks may be included in the one of the listed block groups.

In some implementations, the at least one reference block index may be parsed for the block unit for selecting the at least one prediction reference block from the integer-sample reference blocks and the fractional-sample reference blocks arranged based on the determined arrangement. In some implementations, the at least one reference block index may be parsed for the block unit for selecting the at least one prediction reference block from the reference list. In some implementations, the reference block having a lower cost value may have a lower reference index value. Thus, since the reference block having a lower cost value may be more easily selected than the reference block having a higher cost value, the number of bits in the bitstream may also be reduced.

In some implementations, one or more of the prediction reference blocks may be selected from the fractional-sample reference blocks, when the number of the at least one prediction reference block is greater than 1. Thus, one or more of the reference block indices may be parsed for the block unit for selecting the one or more of the prediction reference blocks only from the fractional-sample reference blocks arranged based on the determined arrangement when the number of the at least one prediction reference block is greater than 1. In addition, the other reference block indices may be parsed for the block unit for selecting the other prediction reference blocks only from the integer-sample reference blocks arranged based on the determined arrangement. In some other implementations, one of the reference block indices may be parsed for the block unit for selecting one of the prediction reference blocks only from the fractional-sample reference blocks arranged based on the determined arrangement when the number of the at least one prediction reference block is greater than 1. In addition, the other reference block indices may be parsed for the block unit for selecting the other prediction reference blocks from the integer-sample reference blocks and the fractional-sample reference blocks arranged based on the determined arrangement.

The selection of the at least one prediction reference block in the method/process 700 may be identical to the selection of the at least one prediction reference block in the method/process 300. In other words, the selection of the at least one prediction reference block at block 760 may be identical to the selection of the at least one prediction reference block at block 360.

Referring back to FIG. 7, at block 770, the decoder module 124 reconstructs the block unit based on the multiple prediction reference blocks.

When the at least one prediction reference block is determined, the decoder module 124 may predict the block unit to generate at least one block predicted region based on the at least one prediction reference block and at least one of the reference filter models, each corresponding to one of the at least one prediction reference block. Each of the at least one block predicted region may include multiple block predicted samples determined by inputting multiple prediction reference samples in one of the at least one prediction reference block to a corresponding one of the at least one of the reference filter models. When one of the at least one prediction reference block is one of the integer-sample reference blocks, the prediction reference samples in the one of the at least one prediction reference block may be the reconstructed samples in the one of the integer-sample reference blocks. When one of the at least one prediction reference block is one of the fractional-sample reference blocks, the prediction reference samples in the one of the at least one prediction reference block may be the fractional-samples in the one of the fractional-sample reference blocks.

With reference to FIGS. 1 and 2, the decoder module 124 may determine multiple weighting parameters based on the integer-sample template cost values and the fractional-sample template cost values for the prediction reference blocks when the number of the at least one prediction reference block is greater than 1. The decoder module 124 may compare the integer-sample template cost values and the fractional-sample template cost values of the prediction reference blocks to determine the weighting parameters. For example, the number of the prediction reference blocks may be equal to Nb, and the number Nb may be a positive integer greater than 1. Thus, the weighting parameters of the Nb prediction reference blocks may be determined based on the following functions:

$$w_{RBi} = \frac{(RC_1 + RC_2 + \dots + RC_{Nb}) - RC_i}{(Nb - 1)(RC_1 + RC_2 + \dots + RC_{Nb})}$$

where the numbers $w_{RBi}$ is a weighting parameter of i-th prediction reference block, $RC_1$, $RC_2$, . . . , and $RC_N$ are the cost values of the prediction reference blocks, and the number i are less than or equal to the number Nb. When the i-th prediction reference block is one of the integer-sample reference blocks, the cost value of the i-th prediction reference block is one of the integer-sample template cost values corresponding to the one of the integer-sample reference blocks. When the i-th prediction reference block is one of the fractional-sample reference blocks, the cost value of the i-th prediction reference block is one of the fractional-sample template cost values corresponding to the one of the fractional-sample reference blocks.

The decoder module 124 may predict the block unit based on the weighting parameters and the block predicted regions corresponding to the prediction reference blocks when the number of the at least one prediction reference block is greater than 1. The decoder module 124 may weightedly combine the block predicted regions to determine a predicted block of the block unit based on the block predicted regions and the weighting parameters.

In some other implementations, the decoder module 124 may directly determine one block predicted regions as the predicted block of the block unit when the number of the at least one prediction reference block is equal to 1.

The decoder module 124 may reconstruct the block unit based on the predicted block. The decoder module 124 may determine multiple residual components from the bitstream for the block unit and add the residual components into the predicted block to reconstruct the block unit. The decoder module 124 may reconstruct all of the other block units in the image frame for reconstructing the image frame and the video. The method/process 700 may then end.

Figure 8:
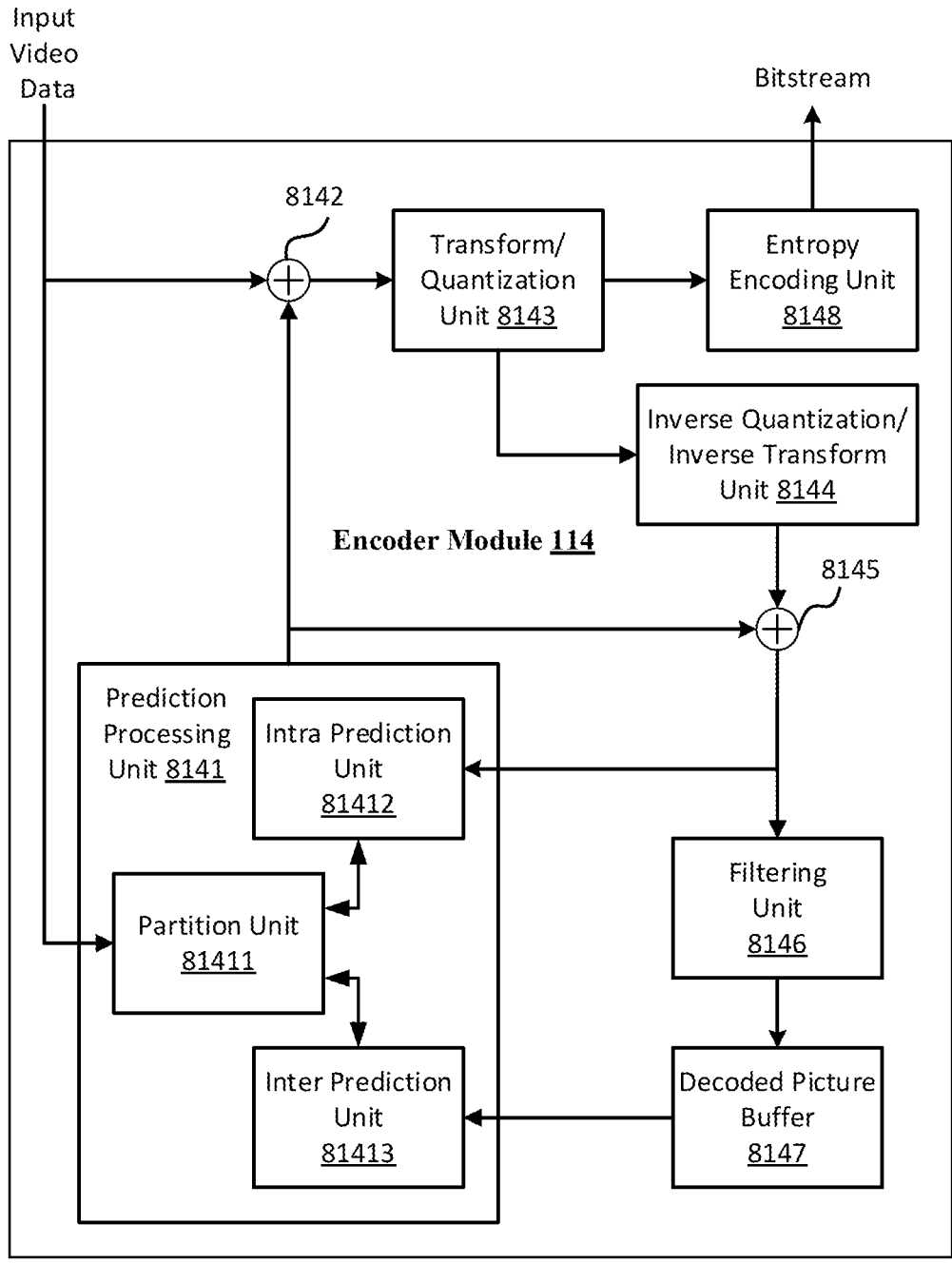
FIG. 8 is a block diagram illustrating an encoder module of the first electronic device illustrated in FIG. 1, in accordance with one or more example implementations of this disclosure.

FIG. 8 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 8141), at least a first summer (e.g., a first summer 8142) and a second summer (e.g., a second summer 8145), a transform/quantization processor (e.g., a transform/quantization unit 8143), an inverse quantization/inverse transform processor (e.g., an inverse quantization/inverse transform unit 8144), a filter (e.g., a filtering unit 8146), a decoded picture buffer (e.g., a decoded picture buffer 8147), and an entropy encoder (e.g., an entropy encoding unit 8148). The prediction processing unit 8141 of the encoder module 114 may further include a partition processor (e.g., a partition unit 81411), an intra prediction processor (e.g., an intra prediction unit 81412), and an inter prediction processor (e.g., an inter prediction unit 81413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 8141 may receive a current image block of a specific one of the image frames. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

The prediction processing unit 8141 may select one of the coding results generated by the intra prediction unit 81412 and the inter prediction unit 81413 based on a mode selection method, such as a cost function. The mode selection method may be a rate-distortion optimization (RDO) process.

The prediction processing unit 8141 may determine the selected coding result and provide a predicted block corresponding to the selected coding result to the first summer 8142 for generating a residual block and to the second summer 8145 for reconstructing the encoded block unit. The prediction processing unit 8141 may further provide syntax elements, such as motion vectors, intra-mode indicators, partition information, and/or other syntax information, to the entropy encoding unit 8148.

The intra prediction unit 81412 may intra-predict the current block unit. The intra prediction unit 81412 may determine an intra prediction mode directed toward a reconstructed sample neighboring the current block unit in order to encode the current block unit.

The intra prediction unit 81412 may encode the current block unit using various intra prediction modes. The intra prediction unit 81412 of the prediction processing unit 8141 may select an appropriate intra prediction mode from the selected modes. The intra prediction unit 81412 may encode the current block unit using a cross-component prediction mode to predict one of the two chroma components of the current block unit based on the luma components of the current block unit. The intra prediction unit 81412 may predict a first one of the two chroma components of the current block unit based on the second of the two chroma components of the current block unit.

The inter prediction unit 81413 may inter-predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the motion based on the received reference image blocks to generate the motion vector.

The first summer 8142 may generate the residual block by subtracting the prediction block determined by the prediction processing unit 8141 from the original current block unit. The first summer 8142 may represent the component or components that perform this subtraction.

The transform/quantization unit 8143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 8143 may perform a scan of the matrix including the quantized transform coefficients. Alternatively, the entropy encoding unit 8148 may perform the scan.

The entropy encoding unit 8148 may receive multiple syntax elements from the prediction processing unit 8141 and the transform/quantization unit 8143, including a quantization parameter, transform data, motion vectors, intra modes, partition information, and/or other syntax information. The entropy encoding unit 8148 may encode the syntax elements into the bitstream.

The entropy encoding unit 8148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 8144 may apply inverse quantization and inverse transformation to reconstruct the residual block in the pixel domain for later use as a reference block. The second summer 8145 may add the reconstructed residual block to the prediction block provided by the prediction processing unit 8141 in order to produce a reconstructed block for storage in the decoded picture buffer 8147.

The filtering unit 8146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 8145.

The decoded picture buffer 8147 may be a reference picture memory that stores the reference block to be used by the encoder module 814 to encode video, such as in intra-coding or inter-coding modes. The decoded picture buffer 8147 may include a variety of memory devices, such as DRAM (e.g., including SDRAM), MRAM, RRAM, or other types of memory devices. The decoded picture buffer 8147 may be on-chip with other components of the encoder module 114 or off-chip relative to those components.

The method/process 300 for decoding and/or encoding video data may be performed by the first electronic device 110. With reference to FIGS. 1, 3, and 8, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

At block 330, the encoder module 114 may determine, for the block unit, multiple integer-sample reference blocks and multiple fractional-sample reference blocks from the current frame. The integer-sample reference blocks and the fractional-sample reference blocks of the block unit determined by the encoder module 114 may be identical to the integer-sample reference blocks and the fractional-sample reference blocks of the block unit determined by the decoder module 124.

At block 340, the encoder module 114 may determine multiple integer-sample template cost values based on the multiple integer-sample reference blocks. At block 350, the encoder module 114 may determine multiple fractional-sample template cost values based on the multiple fractional-sample reference blocks. The integer-sample template cost values and the fractional-sample template cost values for the block unit determined by the encoder module 114 may be identical to the integer-sample template cost values and the fractional-sample template cost values for the block unit determined by the decoder module 124.

At block 360, the encoder module 114 selects multiple prediction reference blocks from the multiple integer-sample reference blocks and the multiple fractional-sample reference blocks based on the multiple integer-sample template cost values and the multiple fractional-sample template cost values. When the block unit is reconstructed by the encoder module 114, the selection of the prediction reference blocks by the encoder module 114 may be identical to the selection of the prediction reference blocks by the decoder module 124.

When the block unit is predicted by the encoder module 114, the encoder module 114 may generate multiple sets of the prediction reference blocks from the integer-sample reference blocks and the fractional-sample reference blocks based on the multiple integer-sample template cost values and the multiple fractional-sample template cost values. Then, the encoder module 114 may predict the block unit based on the multiple sets of the prediction reference blocks to generate multiple first predicted results of the block unit. The prediction for generating one of the first predicted results of the block unit by the encoder module 114 may be identical to the prediction for generating the predicted block of the block unit by the decoder module 124 at block 370. The encoder module 114 may predict the block unit based on other prediction modes to generate multiple second predicted results. The encoder module 114 may select one of the first predicted results and the second predicted results based on a mode selection method, such as a cost function. The mode selection method may be a rate-distortion optimization (RDO) process. The encoder module 114 may provide the selected coding result to the first summer 8142 for generating a residual block and to the second summer 8145 for reconstructing the encoded block unit. The encoder module 114 may further provide syntax elements, such as motion vectors, intra-mode indicators, partition information, and/or other syntax information, to the entropy encoding unit 8148.

At block 370, the encoder module 114 may reconstruct the block unit based on the multiple prediction reference blocks. The reconstruction of the block unit by the encoder module 114 may be identical to the reconstruction of the block unit by the decoder module 124. The method/process 300 for the encoder module 114 may then end.

The method/process 700 for decoding and/or encoding video data may be performed by the first electronic device 110. With reference to FIGS. 1, 7, and 8, at block 710, the method/process 300 may start by the encoder module 114 receiving the video data. The video data received by the encoder module 114 may be a video. At block 720, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

At block 730, the encoder module 114 may determine, for the block unit, multiple integer-sample reference blocks and multiple fractional-sample reference blocks from the current frame. The integer-sample reference blocks and the fractional-sample reference blocks of the block unit determined by the encoder module 114 may be identical to the integer-sample reference blocks and the fractional-sample reference blocks of the block unit determined by the decoder module 124.

At block 740, the encoder module 114 may determine multiple integer-sample filter models based on the multiple integer-sample reference blocks. At block 750, the encoder module 114 may multiple fractional-sample filter models based on the multiple fractional-sample reference blocks. The integer-sample filter models and the fractional-sample filter models for the block unit determined by the encoder module 114 may be identical to the integer-sample filter models and the fractional-sample filter models for the block unit determined by the decoder module 124.

At block 760, the encoder module 114 selects at least one prediction reference block from the multiple integer-sample reference blocks and the multiple fractional-sample reference blocks based on the multiple integer-sample template cost values and the multiple fractional-sample template cost values. When the block unit is reconstructed by the encoder module 114, the selection of the at least one prediction reference block by the encoder module 114 may be identical to the selection of the at least one prediction reference block by the decoder module 124.

When the block unit is predicted by the encoder module 114, the encoder module 114 may generate multiple sets of the at least one prediction reference block from the integer-sample reference blocks and the fractional-sample reference blocks based on the multiple integer-sample template cost values and the multiple fractional-sample template cost values. Then, the encoder module 114 may predict the block unit based on the multiple sets of the at least one prediction reference block to generate multiple first predicted results of the block unit. The prediction of one of the first predicted results of the block unit by the encoder module 114 may be identical to the prediction of the predicted block of the block unit by the decoder module 124 at block 770. The encoder module 114 may predict the block unit based on other prediction modes to generate multiple second predicted results. The encoder module 114 may select one of the first predicted results and the second predicted results based on a mode selection method, such as a cost function. The mode selection method may be a rate-distortion optimization (RDO) process. The encoder module 114 may provide the selected coding result to the first summer 8142 for generating a residual block and to the second summer 8145 for reconstructing the encoded block unit. The encoder module 114 may further provide syntax elements, such as motion vectors, intra-mode indicators, partition information, and/or other syntax information, to the entropy encoding unit 8148.

At block 770, the encoder module 114 may reconstruct the block unit based on the at least one prediction reference block. The reconstruction of the block unit by the encoder module 114 may be identical to the reconstruction of the block unit by the decoder module 124. The method/process 700 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:

receiving the video data;

determining a block unit from a current frame included in the video data;

determining, for the block unit, a plurality of integer-sample reference blocks and a plurality of fractional-sample reference blocks from the current frame, wherein:

each of the plurality of integer-sample reference blocks is located at one of a plurality of integer-sample positions in the current frame, and each of the plurality of fractional-sample reference blocks is located at one of a plurality of fractional-sample positions in the current frame;

determining a plurality of integer-sample template cost values based on the plurality of integer-sample reference blocks of the current frame;

determining a plurality of fractional-sample template cost values based on the plurality of fractional-sample reference blocks of the current frame;

selecting a plurality of prediction reference blocks of the current frame from the plurality of integer-sample reference blocks and the plurality of fractional-sample reference blocks based on the plurality of integer-sample template cost values and the plurality of fractional-sample template cost values; and reconstructing the block unit based on the plurality of prediction reference blocks of the current frame.

2. The method according to claim 1, wherein at least one of the plurality of prediction reference blocks is selected from the plurality of fractional-sample reference blocks.

3. The method according to claim 1, further comprising:

determining a plurality of weighting parameters based on the plurality of integer-sample template cost values and the fractional-sample template cost values for the plurality of prediction reference blocks; and weightedly combining the plurality of prediction reference blocks based on the plurality of weighting parameters to determine a predicted block, wherein reconstructing the block unit is further based on the predicted block.

4. The method according to claim 1, further comprising:

determining an arrangement of the plurality of integer-sample reference blocks and the plurality of fractional-sample reference blocks based on the plurality of integer-sample template cost values and the plurality of fractional-sample template cost values, wherein selecting the plurality of prediction reference blocks is further based on the arrangement.

5. The method according to claim 1, further comprising:

determining a reference area of the block unit from the current image, wherein:

the reference area is reconstructed prior to reconstructing the block unit, and the plurality of integer-sample reference blocks and the plurality of fractional-sample reference blocks are determined from the reference area of the block unit.

6. The method according to claim 5, further comprising:

determining, from the reference area of the current frame, a block template region of the current frame neighboring the block unit;

determining, from the reference area of the current frame, a plurality of integer-sample template regions of the current frame, each neighboring one of the plurality of integer-sample reference blocks, wherein each of the plurality of integer-sample template cost values is determined by calculating a difference between the block template region of the current frame and a corresponding one of the plurality of integer-sample template regions of the current frame; and determining, from the reference area of the current frame, a plurality of fractional-sample template regions of the current frame, each neighboring one of the plurality of fractional-sample reference blocks, wherein each of the plurality of fractional-sample template cost values is determined by calculating a difference between the block template region of the current frame and a corresponding one of the plurality of fractional-sample template regions of the current frame.

7. The method according to claim 5, further comprising:

sub-sampling the reference area based on the block unit by a sub-sampling factor to determine the plurality of integer-sample reference blocks;

determining a plurality of intermediate reference blocks from the plurality of integer-sample reference blocks based on the plurality of integer-sample template cost values; and determining the plurality of fractional-sample reference blocks, each neighboring one of the plurality of intermediate reference blocks.

8. The method according to claim 7, further comprising:

determining the sub-sampling factor for the block unit from the video data.

9. The method according to claim 5, wherein:

the reference area includes a plurality of reconstructed samples reconstructed prior to reconstructing the block unit; and each of the plurality of fractional-sample reference blocks is determined by using an interpolation filter to filter, respectively, at least one of the plurality of reconstructed samples.

10. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame included in the video data;

determine, for the block unit, a plurality of integer-sample reference blocks and a plurality of fractional-sample reference blocks from the current frame, wherein:

each of the plurality of integer-sample reference blocks is located at one of a plurality of integer-sample positions in the current frame, and each of the plurality of fractional-sample reference blocks is located at one of a plurality of fractional-sample positions in the current frame;

determine a plurality of integer-sample template cost values based on the plurality of integer-sample reference blocks of the current frame;

determine a plurality of fractional-sample template cost values based on the plurality of fractional-sample reference blocks of the current frame;

select a plurality of prediction reference blocks of the current frame from the plurality of integer-sample reference blocks and the plurality of fractional-sample reference blocks based on the plurality of integer-sample template cost values and the plurality of fractional-sample template cost values; and reconstruct the block unit based on the plurality of prediction reference blocks of the current frame.

11. The electronic device according to claim 10, wherein at least one of the plurality of prediction reference blocks is selected from the plurality of fractional-sample reference blocks.

12. The electronic device according to claim 10, wherein the one or more computer-executable instructions, when executed by the at least one processor, further cause the electronic device to:

determine a plurality of weighting parameters based on the plurality of integer-sample template cost values and the fractional-sample template cost values for the plurality of prediction reference blocks; and weightedly combine the plurality of prediction reference blocks based on the plurality of weighting parameters to determine a predicted block, wherein reconstructing the block unit is further based on the predicted block.

13. The electronic device according to claim 10, wherein the one or more computer-executable instructions, when executed by the at least one processor, further cause the electronic device to:

determine an arrangement of the plurality of integer-sample reference blocks and the plurality of fractional-sample reference blocks based on the plurality of integer-sample template cost values and the plurality of fractional-sample template cost values, wherein selecting the plurality of prediction reference blocks is further based on the arrangement.

14. The electronic device according to claim 10, wherein the one or more computer-executable instructions, when executed by the at least one processor, further cause the electronic device to:

determine a reference area of the block unit from the current image, wherein:

the reference area is reconstructed prior to reconstructing the block unit, and the plurality of integer-sample reference blocks and the plurality of fractional-sample reference blocks are determined from the reference area of the block unit.

15. The electronic device according to claim 14, wherein the one or more computer-executable instructions, when executed by the at least one processor, further cause the electronic device to:

determine, from the reference area of the current frame, a block template region of the current frame neighboring the block unit;

determine, from the reference area of the current frame, a plurality of integer-sample template regions of the current frame, each neighboring one of the plurality of integer-sample reference blocks, wherein each of the plurality of integer-sample template cost values is determined by calculating a difference between the block template region of the current frame and a corresponding one of the plurality of integer-sample template regions of the current frame; and determine, from the reference area of the current frame, a plurality of fractional-sample template regions of the current frame, each neighboring one of the plurality of fractional-sample reference blocks, wherein each of the plurality of fractional-sample template cost values is determined by calculating a difference between the block template region of the current frame and a corresponding one of the plurality of fractional-sample template regions of the current frame.

16. The electronic device according to claim 14, wherein the one or more computer-executable instructions, when executed by the at least one processor, further cause the electronic device to:

sub-sample the reference area based on the block unit by a sub-sampling factor to determine the plurality of integer-sample reference blocks;

determine a plurality of intermediate reference blocks from the plurality of integer-sample reference blocks based on the plurality of integer-sample template cost values; and determine the plurality of fractional-sample reference blocks, each neighboring one of the plurality of intermediate reference blocks.

17. The electronic device according to claim 16, wherein the one or more computer-executable instructions, when executed by the at least one processor, further cause the electronic device to:

determine the sub-sampling factor for the block unit from the video data.

18. The electronic device according to claim 14, wherein:

the reference area includes a plurality of reconstructed samples reconstructed prior to reconstructing the block unit; and each of the plurality of fractional-sample reference blocks is determined by using an interpolation filter to filter, respectively, at least one of the plurality of reconstructed samples.

* * * * *